United States Patent [19]

Schrenk et al.

[11] Patent Number: 5,872,653
[45] Date of Patent: Feb. 16, 1999

[54] BIREFRINGENT INTERFERENCE POLARIZER

[75] Inventors: Walter J. Schrenk; John A. Wheatley, both of Midland, Mich.; Victor S. Chang, Ellicott City, Md.

[73] Assignee: Minnesota Mining and Manufacturing Company, St. Paul, Minn.

[21] Appl. No.: 768,525

[22] Filed: Dec. 18, 1996

Related U.S. Application Data

[62] Division of Ser. No. 452,832, May 30, 1995, Pat. No. 5,612,820, which is a division of Ser. No. 618,191, Nov. 26, 1990, Pat. No. 5,486,949, which is a continuation-in-part of Ser. No. 463,645, Jan. 11, 1990, Pat. No. 5,122,905, which is a continuation-in-part of Ser. No. 466,168, Jan. 17, 1990, Pat. No. 5,122,906, which is a continuation-in-part of Ser. No. 368,695, Jun. 20, 1989, abandoned.

[51] Int. Cl.$^6$ ............................ G02B 5/30; B29C 47/06; B29D 11/00
[52] U.S. Cl. ...................... 359/498; 359/500; 359/900; 156/229; 156/244.11; 264/1.34; 264/1.7; 425/131.1; 425/133.5; 427/163.1
[58] Field of Search .................... 359/488, 489, 359/490, 494, 497, 498, 500, 900; 425/131.1, 133.5; 427/163.1; 156/229, 244.11; 264/1.31, 1.34, 1.7

[56] References Cited

U.S. PATENT DOCUMENTS

| | | |
|---|---|---|
| 3,213,753 | 10/1965 | Rogers . |
| 3,438,691 | 4/1969 | Makas . |
| 3,557,265 | 1/1971 | Chisholm et al. . |
| 3,610,729 | 10/1971 | Rogers . |
| 3,711,176 | 1/1973 | Alfrey, Jr. et al. . |
| 3,759,647 | 9/1973 | Schrenk et al. . |
| 3,773,882 | 11/1973 | Schrenk . |
| 3,884,606 | 5/1975 | Schrenk . |
| 4,309,075 | 1/1982 | Apfel et al. . |
| 4,310,584 | 1/1982 | Cooper et al. . |
| 4,446,305 | 5/1984 | Rogers et al. . |
| 4,525,413 | 6/1985 | Rogers et al. . |
| 4,540,623 | 9/1985 | Im et al. . |
| 4,805,989 | 2/1989 | Nakajima . |
| 4,895,769 | 1/1990 | Land et al. . |
| 4,937,134 | 6/1990 | Schrenk et al. . |
| 5,122,905 | 6/1992 | Wheatley et al. . |
| 5,122,906 | 6/1992 | Wheatley . |
| 5,486,949 | 1/1996 | Schrenk et al. . |
| 5,612,820 | 3/1997 | Schrenk et al. .................. 359/498 |

FOREIGN PATENT DOCUMENTS

| | | |
|---|---|---|
| 0062751 | 10/1982 | European Pat. Off. . |
| 0228611 | 7/1987 | European Pat. Off. . |
| 2059702 | 5/1990 | Japan . |

OTHER PUBLICATIONS

Radford et al, "Reflectivity of Iridescent Coextruded Multilayered Plastic Films," *Polymer Engineering and Science*, May 1973, vol. 13, No. 3.

Vasicek, "Optics of Thin Films" (1960).

*Primary Examiner*—Ricky D. Shafer
*Attorney, Agent, or Firm*—Killworth, Gottman, Hagen & Schaeff, LLP

[57] ABSTRACT

A birefringent interference polarizer which may be fabricated from readily available materials using established coextrusion techniques is provided. The polarizer has a level of light absorption near zero and can be fabricated to polarize and reflect light of specific wavelengths while transmitting light of other wavelengths. The polarizer includes multiple alternating oriented layers of at least first and second polymeric materials having respective nonzero stress optical coefficients which are sufficiently different to produce a refractive index mismatch between the first and second polymeric materials in a first plane which is different from the refractive index mismatch between the first and second polymeric materials in a second plane normal to the first plane. The refractive index mismatch in the first plane is preferably at least 0.03.

2 Claims, 1 Drawing Sheet

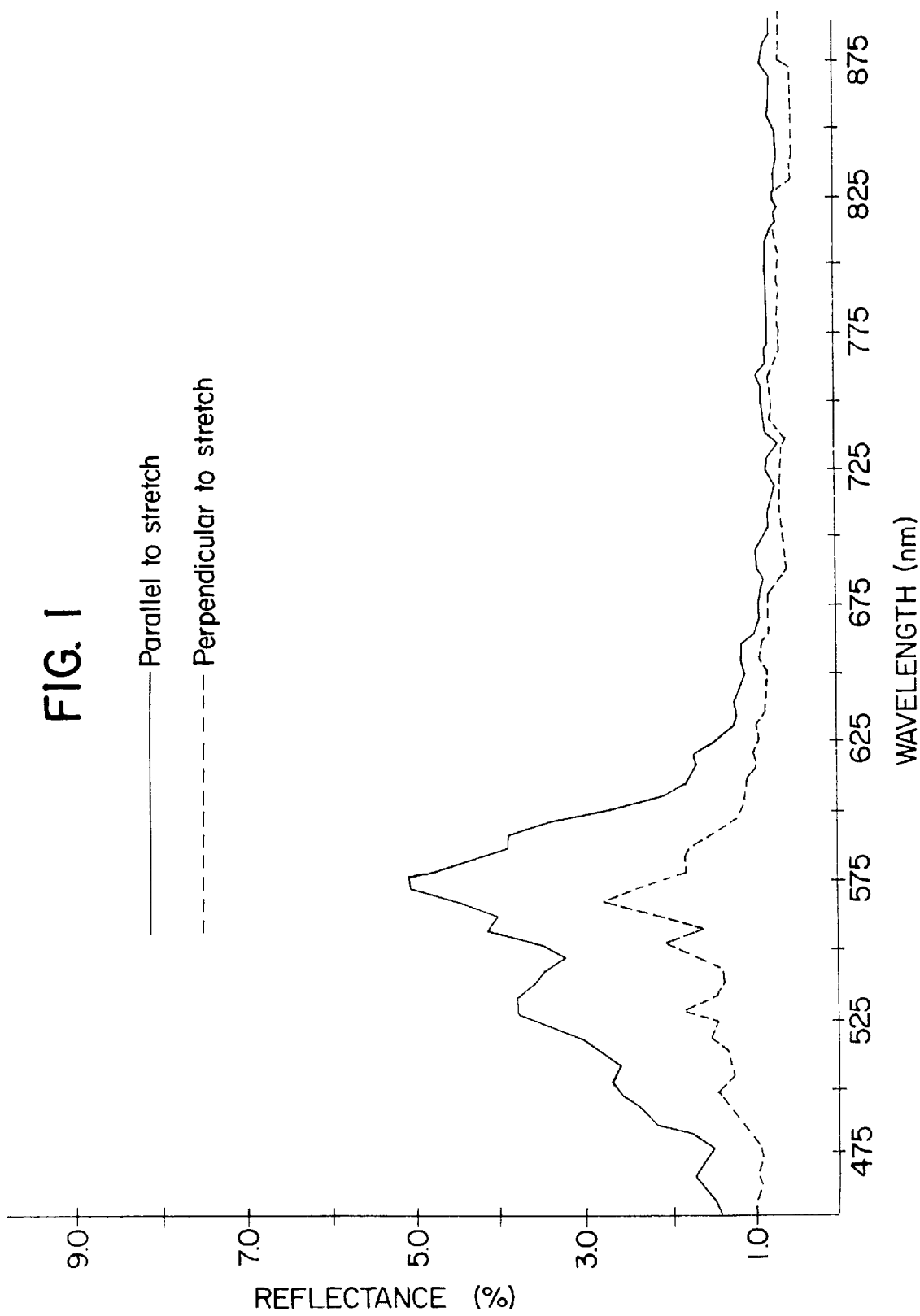

BIREFRINGENT INTERFERENCE POLARIZER

This is a division of application Ser. No. 08/452,832, filed May 30, 1995, now U.S. Pat. No. 5,612,820 which is a division of application Ser. No. 07/618,191 filed Nov. 26, 1990, now U.S. Pat. No. 5,486,949, which is a continuation-in-part of U.S. application Ser. No. 463,645 filed Jan. 11, 1990, now U.S. Pat. No. 5,122,905, and which is also a continuation-in-part of U.S. application Ser. No. 466,168 filed Jan. 17, 1990, now U.S. Pat. No. 5,122,906, both of which applications are themselves continuations-in-part of U.S. application Ser. No. 368,695, filed Jun. 20, 1989, now abandoned.

BACKGROUND OF THE INVENTION

The present invention relates to a multilayer birefringent interference polarizer, and more particularly to a multilayer coextruded polymeric device which can be designed to polarize selected wavelengths of light by constructive optical interference.

Birefringent polarizers are generally known in the art and have been used in the past to polarize and filter selected wavelengths of light. For example, birefringent polarizers may be used to reject (reflect) specific polarized narrow wavelength ranges while transmitting the remainder of the incident light, to reduce glare from other light sources, and to act as beam splitters.

Many naturally occurring crystalline compounds act as birefringent polarizers. For example, calcite (calcium carbonate) crystals have well known birefringent properties. However, single crystals are expensive materials and cannot be readily formed into the desired shapes or configurations which are required for particular applications. Others in the art, such as Makas, U.S. Pat. No. 3,438,691, have fabricated birefringent polarizers from plate-like or sheet-like birefringent polymers such as polyethylene terephthalate incorporated into an isotropic matrix polymer.

In many instances, polymers can be oriented by uniaxial stretching to orient the polymer on a molecular level such as taught by Rogers et al, U.S. Pat. No. 4,525,413. Multilayer optical devices comprising alternating layers of highly birefringent polymers and isotropic polymers having large refractive index mismatches have been proposed by Rogers et al. However, the Rogers et al device requires the use of specific highly birefringent polymers having certain mathematical relationships between their molecular configurations and electron density distributions.

Accordingly, there remains a need in the art for birefringent interference polarizers which can be readily produced using existing techniques and readily available materials. Further, there still exists a need in the art for birefringent interference polarizers which absorb little light. Further, the need exists in the art for birefringent polarizers which can be fabricated to polarize light of specific wavelengths as desired.

SUMMARY OF THE INVENTION

The present invention meets that need by providing a birefringent interference polarizer in the form of a multi-layered sheet or film which may be fabricated from readily available materials using established coextrusion techniques. The polarizer of the present invention has a level of light absorption near zero and can be fabricated to polarize and reflect light of specific wavelengths while transmitting light of other wavelengths. The polarizer will also polarize the transmitted light at those wavelengths, while the remainder of the transmitted light remains unpolarized.

Reference to polarizers, polarized light, and polarization as used herein refers to a condition of light in which the transverse vibration of the rays assume different forms in different planes. Polarization, as used herein, includes the nonequal reflection of light in orthogonal planes and encompasses elliptical and circular polarization of light as well as plane polarization. By "light", we mean not only light in the visible spectrum, but also ultraviolet and infrared light. When the plane of orientation of the polymeric materials is discussed herein, we are referring to the directions of orientation of the polymeric materials due to uniaxial or biaxial stretching of the materials in the x and/or y direction to define the polarizing effect of the materials. In other contexts, reference to the plane that light enters or impinges upon the layers of polymeric materials is a plane normal to the major surfaces of the layers (i.e., the z direction), unless otherwise indicated.

In accordance with one aspect of the present invention, a birefringent interference polarizer is provided comprising multiple alternating oriented layers of at least first and second polymeric materials having respective nonzero stress optical coefficients which are sufficiently different to produce a refractive index mismatch between the first and second polymeric materials in a first plane which is different from the refractive index mismatch between the first and second polymeric materials in a second plane normal to the first plane.

The birefringent polarizer of the present invention may also comprise three or more alternating layers of diverse polymeric materials. For example, a three layer pattern of repeating units ABCBA may be used, where the B unit is a copolymer or miscible blend of the A and C repeat units. In some instances, the B layer may not only contribute to the light polarization properties of the invention, but also act as an adhesive layer to bond the A and C layers together.

Also, the third polymer layer may be found as a surface or skin layer on one or both major exterior surfaces for an ABABAB repeating body or as an interior layer. The skin layer may be sacrificial, or may be permanent and serve as scratch resistant or weatherable protective layer. Further, such skin layers may be post applied to the polarizer after coextrusion. For example, a skin layer may be applied as a sprayed on coating which would act to level the surface of the polarizer to improve optical properties and impart scratch resistance, chemical resistance and/or weatherability. The skin layer may also be laminated to the multilayered polarizer. Lamination is desirable for those polymers which are not readily coextrudable.

In one embodiment of the invention, the first and second polymeric materials have substantially equal refractive indices when unoriented. The refractive index mismatch develops in the plane of orientation when the materials are stretched. In another embodiment, the first and second polymeric materials have differing refractive indices when unoriented. Orienting the polymers by stretching causes the mismatch between respective refractive indices in one of the planes to decrease, while the mismatch in the other plane is maintained or increased. The polarizer may be uniaxially or biaxially oriented.

In a preferred form of the invention, the first polymeric material has a positive stress optical coefficient, while the second polymeric material has a negative stress optical coefficient. Preferably, the refractive index mismatch in the first plane is at least 0.03, and most preferably 0.05 or greater.

Preferably, the optical thickness of each polymeric layer is from about 0.09 micrometers to about 0.70 micrometers. Optical thickness, nd, is defined as the product of the physical thickness of the layer (d) and its refractive index (n). In a preferred form of the invention, the layers increase in thickness monotonically through the thickness of the film to produce a layer thickness gradient which reflects and polarizes a broad range of wavelengths of light.

The two polymeric materials can be any of a number of different polymers which possess nonzero stress optical coefficients which provide the necessary refractive index mismatch when the materials are oriented. By nonzero stress optical coefficient, it is meant that the refractive index of the polymer changes in either a positive or negative direction when the polymer is oriented. Isotropic materials possessing zero stress optical coefficients lack birefringence.

For example, the first polymeric material may be a polycarbonate, such as a bisphenol A based polycarbonate, or a polyethylene terephthalate, both of which possess positive stress optical coefficients. The second polymeric material may be a polystyrene which has. a negative stress optical coefficient. Either generally amorphous atactic polystyrenes or more crystalline syndiotactic polystyrenes are suitable. Other suitable polymers for the second polymeric material include copolymers of styrene and acrylonitrile, copolymers of styrene and methyl methacrylate, and polyethylene naphthalate, all of which possess negative stress optical coefficients.

The polarizer of the present invention reflects and polarizes a portion of the light incident on its surface while transmitting the remainder of the incident light. During fabrication, it may be designed to transmit only a narrow range of wavelengths while reflecting a broad range, or vice versa. The polarizer of the present invention may also be designed to reflect and polarize substantially all light incident in one plane of the device while transmitting substantially all light incident in a plane normal thereto.

In some embodiments of the invention it may be desirable to incorporate coloring agents such as dyes or pigments into one or more of the individual layers of the birefringent polarizer. This can be done to one or both of the outer or skin layers of the body, or alternatively, the coloring agent may be incorporated into one or more interior layers in the polarizer. The use of pigments or dyes permits the selective absorption of certain wavelengths of light by the polarizer. While an unpigmented or undyed multilayer film will reflect specific polarized wavelengths and transmit the remainder of incident light, pigments and dyes can be used to further control the bandwidth of reflected polarized light and the wavelength range of transmitted light. For example, all transmitted light may be absorbed by coextruding a black layer on the back side of the birefringent polarizer. Furthermore, dyes may be used to narrow the wavelength band of reflected polarized light and transmitted light by absorbing selected wavelengths.

The polymers chosen will determine the refractive index mismatch, respective stress optical coefficients, and glass transition temperatures. The number of layers, degree of orientation, layer thicknesses, and use of pigments or dyes may all be adjusted (controlled) to provide a polarizer having the desired characteristics for a particular end use. This contrasts to prior art devices which were limited both in design and polarization characteristics.

In another embodiment of the invention, a tunable birefringent interference polarizer is provided and comprises multiple alternating layers of first and second elastomeric materials having respective nonzero stress optical coefficients which are sufficiently different to produce a refractive index mismatch between the first and second elastomeric materials in a first plane which is different from the refractive index mismatch between the first and second elastomeric materials in a second plane normal to the first plane. Because the individual layers forming the polarizer are elastomers, the polarizer variably polarizes wavelengths of light dependent upon the degree of elongation of the elastomers. Additionally, because the layers are elastomers, the polarizer is tunable and reversible as the device is returned to a relaxed state.

The present invention also provides a method of making a birefringent interference polarizer comprising the steps of coextruding at least first and second polymeric materials having respective nonzero stress optical coefficients in multiple layers. The layers may be stretched to orient the polymeric materials and produce a refractive index mismatch in a first plane which is different from the refractive index mismatch between the first and second polymeric materials in a second plane normal to the first plane. While many polymer combinations can be stretched at temperatures above the glass transition temperature but below the melting temperature of the polymers, some polymer combinations can be "cold drawn," where one or more of the polymers can be stretched at a temperature below its glass transition temperature.

In one embodiment of the invention, the first and second polymeric materials have substantially equal refractive indices when unoriented, with a refractive index mismatch in one plane developing upon orientation. In another embodiment, when oriented, the first and second polymeric materials have substantially equal refractive indices in one of the first and second planes, but there is a refractive index mismatch in the other plane. The orientation of the polymeric materials may be either uniaxial or biaxial.

Preferably, the refractive index mismatch in the first plane is at least about 0.03, and most preferably at least 0.05 or greater, with the optical thickness of each layer being from about 0.09 micrometers to about 0.70 micrometers. In one embodiment, the layers increase in thickness monotonically through the thickness of the film to provide a polarizer which reflects a broad range of wavelengths. In a preferred form of the invention, the first polymeric material has a positive stress optical coefficient, and the second polymeric material has a negative stress optical coefficient.

Accordingly, it is an object of the present invention to provide a birefringent interference polarizer, and method of making, which may be fabricated from readily available materials, using established coextrusion techniques, to include having a level of light absorption near zero and be fabricated to reflect and polarize light of specific wavelengths while transmitting light of other wavelengths. This, and other objects and advantages of the present invention will become apparent from the following detailed description, the accompanying drawings, and the appended claims.

BRIEF DESCRIPTION OF THE DRAWINGS

FIG. 1 is a graph of reflectance versus wavelength of light for a multilayer optical interference polarizer made in accordance with the present invention.

DETAILED DESCRIPTION OF THE PREFERRED EMBODIMENT

The present invention provides improved optical interference polarizers in the form of multilayer films with a number of desirable properties including the ability to tailor the device to polarize selected wavelengths of light. The basic optical principles involved in the present invention are those relating to the reflection of light by thin film layers having differing refractive indices. These principles demonstrate the dependency of the effect on both individual layer thickness as well as refractive index of the material. See, Radford et al, "Reflectivity of Iridescent Coextruded Multilayered Plastic Films", 13 Polymer Engineering and Science 216 (1973).

A thin film is described in the literature as one whose thickness, d, is less than about 0.5 micrometers or whose optical thickness, nd (where n is the refractive index of the material) is less than about 0.7 micrometers. Vasicek, *Optics of Thin Films* (1960) at pages 100 and 139.

Interference films which rely on the constructive optical interference of light to produce intense reflected light in the visible, ultraviolet, or infrared portions of the electromagnetic spectrum have been described in the prior art. See, for example, Alfrey, Jr. et al, U.S. Pat. No. 3,711,176. Such interference films act according to the equation:

$$\lambda_m = (2/m)(N_1 D_1 + N_2 D_2)$$

where $\lambda_m$ is the reflected wavelength in nanometers, $N_1$ and $N_2$ are the refractive indices of the alternating polymers, $D_1$ and $D_2$ are the thickness of the respective layers of polymers in nanometers, and m is the order of reflection (m=1,2,3,4, 5). This is the equation for light incident normal to the surface of the film. For other angles of incidence, the equation will be modified to take into account the angle, as is known in the art. The polarizer of the present invention is operable for all angles of incident light. Each solution of the equation determines a wavelength at which an intense reflection, relative to surrounding regions, is expected. The intensity of the reflection is a function of the "f-ratio" where, $$f = \frac{N_1 D_1}{(N_1 D_1 + N_2 D_2)}$$

By proper selection of the f-ratio, one can exercise some degree of control over the intensity of reflection of the various higher order reflections. For example, first order visible reflections of violet (about $0.38\mu$ wavelength) to red (about $0.68\mu$ wavelength) can be obtained with layer optical thicknesses between about 0.075–0.25 micrometers.

However, light reflected from prior art thin layer interference films is not polarized. The light reflected from the alternating polymeric layers of the present invention is polarized principally due to the birefringent nature of the film. Thus, in its preferred form, the birefringent interference polarizer of the present invention comprises multiple alternating oriented layers of at least first and second polymeric materials having respective nonzero stress optical coefficients which are sufficiently different to produce a refractive index mismatch between the first and second polymeric materials in a first plane which is different from the refractive index mismatch between the first and second polymeric materials in a second plane normal to the first plane. This refractive index mismatch is preferably at least about 0.03, and most preferably at least 0.05 or greater. This construction results in a polarizer having optical interference in a first plane, such as the plane of orientation, and near zero optical interference in a second plane normal thereto.

Preferably, the optical thickness of each polymeric layer is in the range of from about 0.09 to about 0.70 micrometers. Polymers suitable for use in the practice of the present invention include generally transparent thermoplastic polymers having stress optical coefficients which provide the necessary refractive index mismatch in at least one plane when the polymers are oriented. Additionally, it is desirable from a processing standpoint that the polymers be compatible for coextrusion.

One example of a suitable polymer pair is polycarbonate and polystyrene. Syndiotactic polystyrene is believed to be especially suitable. Polycarbonate has a positive stress optical coefficient, while polystyrene has a negative stress optical coefficient. Both have refractive indices (unoriented) of approximately 1.6. Other generally transparent thermoplastic polymers which are suitable for use in the present invention include elastomers such as those described in commonly-assigned copending application Ser. No. 339, 267, filed Apr. 17, 1989, and entitled "Elastomeric Optical Interference Films", now U.S. Pat. No. 4,937,134, issued Jun. 26, 1990, the disclosure of which is hereby incorporated by reference.

Additionally, other polymers and copolymers such as polyethylene 2,6 naphthalate, a copolymer based on 1,4-cyclohexanedimethylene terephthalate (PCTG), and copolymers of gluterimide and methyl methacrylate (KAMAX resins, available from Rohm and Haas), are useful in the practice of the present invention. Further, miscible blends of polymers may be used to adjust the refractive index, stress optical coefficient, and glass transition temperature of the layers used in the polarizer. Other exemplary thermoplastic resins, along with representative refractive indices, which may find use in the practice of the present invention include, but are not limited to: perfluoroalkoxy resins (refractive index=1.35), polytetrafluoroethylene (1.35), fluorinated ethylene-propylene copolymers (1.34), silicone resins (1.41), polyvinylidene fluoride (1.42), polychlorotrifluoroethylene (1.42), epoxy resins (1.45), poly(butyl acrylate) (1.46), poly(4-methylpentene-1) (1.46), poly(vinyl acetate) (1.47), ethyl cellulose (1.47), polyformaldehyde (1.48), polyisobutyl methacrylate (1.48), polymethyl acrylate (1.48), polypropyl methacrylate (1.48), polyethyl methacrylate (1.48), polyether block amide (1.49), polymethyl methacrylate (1.49), cellulose acetate (1.49), cellulose propionate (1.49), cellulose acetate butyrate (1.49), cellulose nitrate (1.49), polyvinyl butyral (1.49), polypropylene (1.49), polybutylene (1.50), ionomeric resins such as Surlyn (trademark) (1.51), low density polyethylene (1.51), polyacrylonitrile (1.51), polyisobutylene (1.51), thermoplastic polyesters such as Ecdel (trademark) (1.52), natural rubber (1.52), perbunan (1.52), polybutadiene (1.52), nylon (1.53), polyacrylic imides (1.53), poly(vinyl chloro acetate) (1.54), polyvinyl chloride (1.54), high density polyethylene (1.54), copolymers of methyl methacrylate and styrene (1.54), transparent acrylonitrile-butadiene-styrene terpolymer (1.54), allyl diglycol resin (1.55), blends of polyvinylidene chloride and polyvinyl chloride such as Saran resins (trademark)(1.55), polyalpha-methyl styrene (1.56), styrene-butadiene latexes such as Dow 512-K (trademark) (1.56), polyurethane (1.56), neoprene (1.56), copolymers of styrene and acrylonitrile such as Tyril resin (trademark) (1.57), copolymers of styrene and butadiene (1.57), other thermoplastic polyesters such as polyethylene terephthalate and polyethylene terephthalate glycol (1.60), polyimide (1.61), polyvinylidene chloride (1.61), polydichlorostyrene (1.62), polysulfone (1.63), polyether sulfone (1.65), and polyetherimide (1.66).

Copolymers and miscible blends of the above polymers may also find use in the practice of the present invention. Such copolymers and blends may be used to provide an extremely wide variety of different refractive indices which may be matched to provide optimum polarizing effects.

Additionally, the use of copolymers and miscible blends of polymers may be used to enhance the processability of the alternating layers during coextrusion and orientation. Further, the use of copolymers and miscible blends permits the adjustment of the stress optical coefficients and glass transition temperatures of the polymers.

Multilayer birefringent interference polarizing films in accordance with the present invention are most advantageously prepared by employing a multilayered coextrusion device as described in U.S. Pat. Nos. 3,773,882 and 3,884,606 the disclosures of which are incorporated herein by reference. Such a device provides a method for preparing multilayered, simultaneously extruded thermoplastic materials, each of which are of a substantially uniform layer thickness. Preferably, a series of layer multiplying-means as are described in U.S. Pat. No. 3,759,647 the disclosure of which is incorporated herein by reference may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body.

After coextrusion, and layer multiplication, the resultant multilayer film is stretched, either uniaxially or biaxially, at a temperature above the respective glass transition temperatures of the polymers, but below their respective melting temperatures. Alternatively, the multilayer film may be cold drawn and stretched below the glass transition temperature of at least one of the polymers in the film. This causes the polymers to orient and produces a refractive index mismatch in at least one plane of the polarizer due to the differences in stress optical coefficients and/or refractive indices between the polymers.

Polarization of selected wavelengths of light is achieved by means of constructive optical interference due to the refractive index mismatch in at least one plane of the polarizer. The polarizer can be constructed so that different wavelengths may be polarized as desired. Control of the refractive index mismatch, relative layer thicknesses within the film, and the amount of induced orientation in the film determines which wavelengths will be polarized. As with other interference films, the wavelengths of light which are polarized are also dependent on the angle of incidence of the incoming light relative to the surface of the polarizer.

The birefringent interference polarizer of the present invention reflects and polarizes a portion of the light incident on its surface while transmitting the remainder of the incident light. Essentially no light is absorbed by the polarizer. During fabrication, the layer thicknesses of the alternating polymer layers may be controlled so that the polarizer transmits only a narrow range of wavelengths while reflecting and polarizing a broad range. For example, the layers in the multilayer film may be arranged so that their thickness increases monotonically through the thickness of the film to produce a layer thickness gradient. This provides broad bandwidth reflective properties to the polarizer. Such a polarizer can be used as a band pass filter which transmits only a narrow range of wavelengths.

Alternatively, the film can be constructed to polarize and reflect only a narrow wavelength range while remaining transparent to the remaining portion of incident light. If white light is used as a source, the polarizer of the present invention will reflect polarized light of specific wavelengths in one plane dependent upon the optical thicknesses of the layers, while transmitting the remaining light.

One end use for the polarizer of the present invention is installation on an aircraft or vehicular windshield onto which a "heads-up" display is projected. The polarizer will reduce the glare component from outside of the aircraft or vehicle, or from within the aircraft or vehicle itself which is at the same angle as the projected heads-up image. The use of the present invention results in increased transmission of other incident light over that which would be possible using conventional polarizers which absorb at least some of the incident light. Another use for the polarizer of the present invention is as a beam splitter.

In order that the invention may be more readily understood, reference is made to the following example, which is intended to be illustrative of the invention, but is not intended to be limiting in scope.

EXAMPLE 1

Employing an apparatus as generally described in U.S. Pat. Nos. 3,773,882 and 3,759,647, a sheet of a birefringent interference polarizing film was prepared. The sheet was approximately 0.003 inches in thickness and had 385 alternating layers (ABABAB) of polycarbonate (Calibre 300-15, trademark of Dow Chemical Company) and polystyrene (Styron 685D, trademark of Dow Chemical Company).

A 1" by 1" by 0.003" sample of the film was post stretched uniaxially at 160° C. (above the glass transition temperature of the two polymers) at 650 lb/in$^2$ from its original 1" length to a final length of 3" and then quickly quenched with water to orient the polymers. Final sample thickness averaged 0.0015", and the minimum width of the sample was 0.50".

The post-stretch conditions were controlled to provide a final average layer thickness of 856.8 angstroms for the polycarbonate layers and 873.1 angstroms for the polystyrene layers. These layer thicknesses were calculated to provide a polarizing film which polarized light in the middle of the visible spectrum ($\lambda$=5500 angstroms) with an f-ratio, as defined above, of 0.5.

Both polymers had measured refractive indices of about 1.6 in an unoriented condition. However, the polycarbonate was measured to have a positive stress optical coefficient of approximately +5,000 Brewsters, while the polystyrene was measured to have a negative stress optical coefficient of approximately −5,000 Brewsters. The degree of post-stretching was controlled to provide a refractive index mismatch between the two polymers of 0.03 in the plane of orientation.

To determine whether the film acted as a polarizer, two of the 385 layer films were laminated prior to uniaxial stretching to orient the polymers in the film. Reflectance at a given wavelength was measured along a plane parallel to the uniaxial stretch and along a plane normal to the plane of uniaxial stretch. As can be seen from the graph of FIG. 1, reflectance differences in the parallel and perpendicular planes over a wide range of wavelengths demonstrate that the film was functioning to polarize light.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of making a birefringent interference polarizer comprising the steps of:

providing at least first and second polymeric materials having respective nonzero stress optical coefficients, said first and second polymeric materials comprising copolymers or miscible blends of polymers to adjust the respective refractive indices, stress optical coefficients, and glass transition temperatures of said polymeric materials, coextruding said first and second polymeric materials in multiple alternating layers, and stretching said layers such that said first and second polymeric materials become oriented and produce a refractive index mismatch in a first plane which is different from the refractive index mismatch between said first and second polymeric materials in a second plane normal to said first plane.

2. A method of making a tunable birefringent polarizer comprising the steps of:

providing at least first and second elastomeric materials having respective nonzero stress optical coefficients, coextruding said first and second elastomeric materials in multiple alternating layers, said layers increasing in thickness to produce a layer thickness gradient, stretching said layers such that said first and second elastomeric materials become oriented and produce a refractive index mismatch between said first and second elastomeric materials in a second plane normal to said first plane to form said tunable birefringent polarizer, and variably polarizing wavelengths of light with said tunable birefringent polarizer by controlling the degree of elongation of said elastomers.

* * * * *